United States Patent [19]

Hennessey

[11] 4,149,608
[45] Apr. 17, 1979

[54] TRACTOR CHASSIS AND CAB SUSPENSION SYSTEM

[75] Inventor: Richard G. Hennessey, Oak Lawn, Ill.

[73] Assignee: International Harvester Company, Chicago, Ill.

[21] Appl. No.: 886,715

[22] Filed: Mar. 15, 1978

[51] Int. Cl.² .............................................. B62D 23/00
[52] U.S. Cl. ............................... 180/89.14; 296/35 R
[58] Field of Search .......................... 180/89.12–89.14, 180/89.18, 69; 296/28 C, 35 R; 280/713, 723

[56] References Cited

U.S. PATENT DOCUMENTS

| | | | |
|---|---|---|---|
| 3,618,692 | 11/1971 | Strikeleather | 180/89.14 |
| 3,741,329 | 6/1973 | Davis | 180/89.14 |
| 3,789,945 | 2/1974 | Hansen | 180/69 R |
| 3,944,017 | 3/1976 | Foster | 296/28 C X |
| 3,966,009 | 6/1976 | Meacock | 296/28 C X |
| 4,043,584 | 8/1977 | Wagner | 296/35 R |

*Primary Examiner*—Joseph F. Peters, Jr.
*Assistant Examiner*—Terrance L. Siemens
*Attorney, Agent, or Firm*—Douglas W. Rudy; Ronald C. Kamp; F. David AuBuchon

[57] ABSTRACT

An operator's platform, a vehicle cab and a forward tractor engine enclosure are pivotally mounted as a unit at a forward pivot point to a tractor frame. These components are suspended at the rear portion of the frame through an integrated suspension system including a coil spring and a shock absorber. A pair of stationary vertical guide members at the rear of the vehicle interact with adjacent wall guide surfaces of the suspended chassis. These stationary vertical guide surfaces allow the suspended chassis to pivot in a vertical plane around the forward pivot points while controlling lateral movement of the cab relative to the vehicle chassis.

11 Claims, 6 Drawing Figures

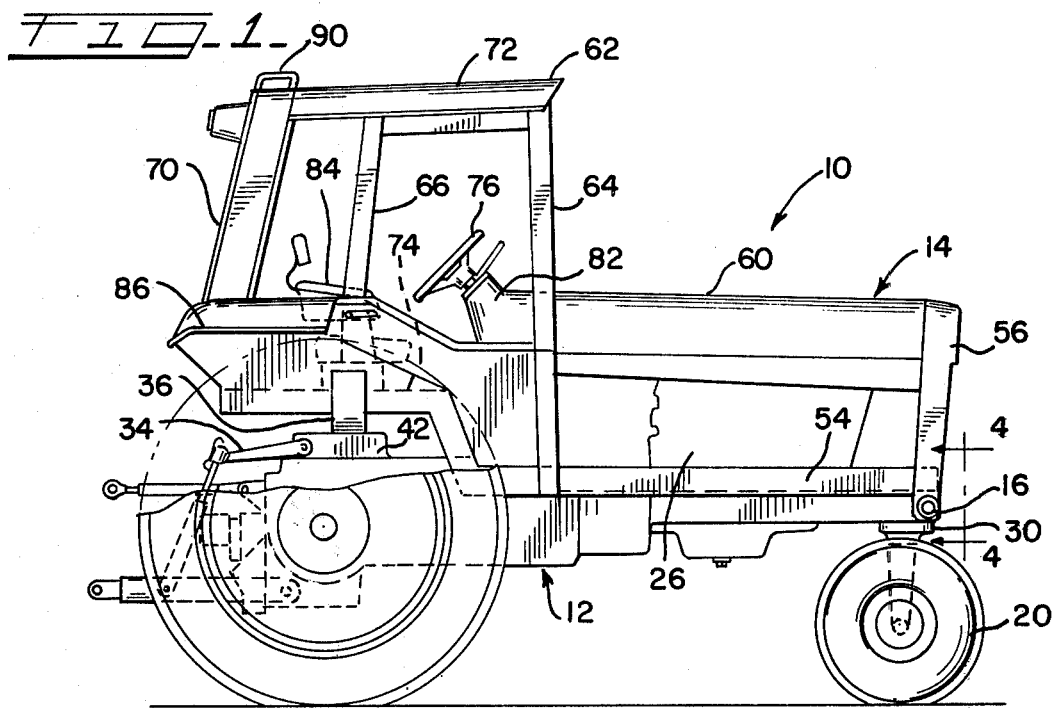
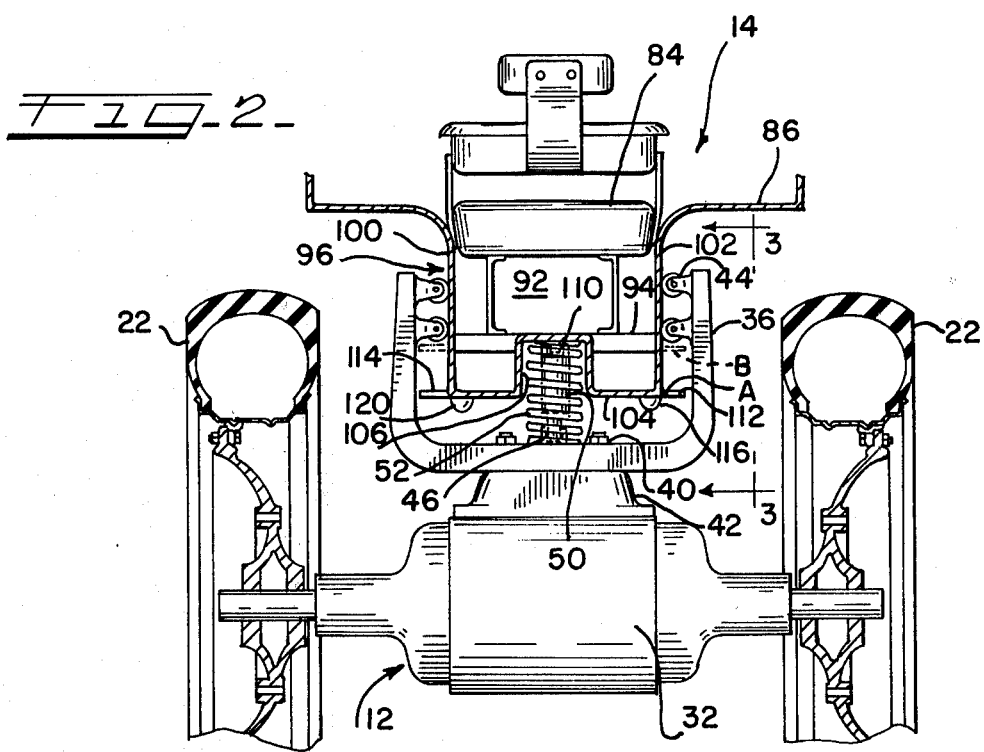

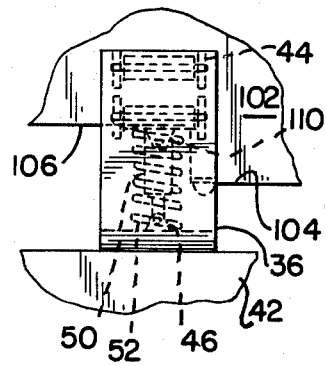
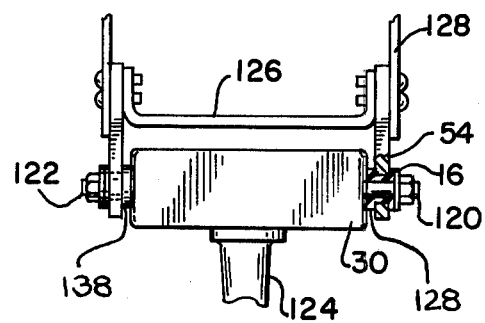
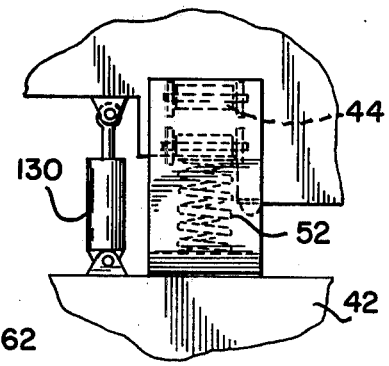
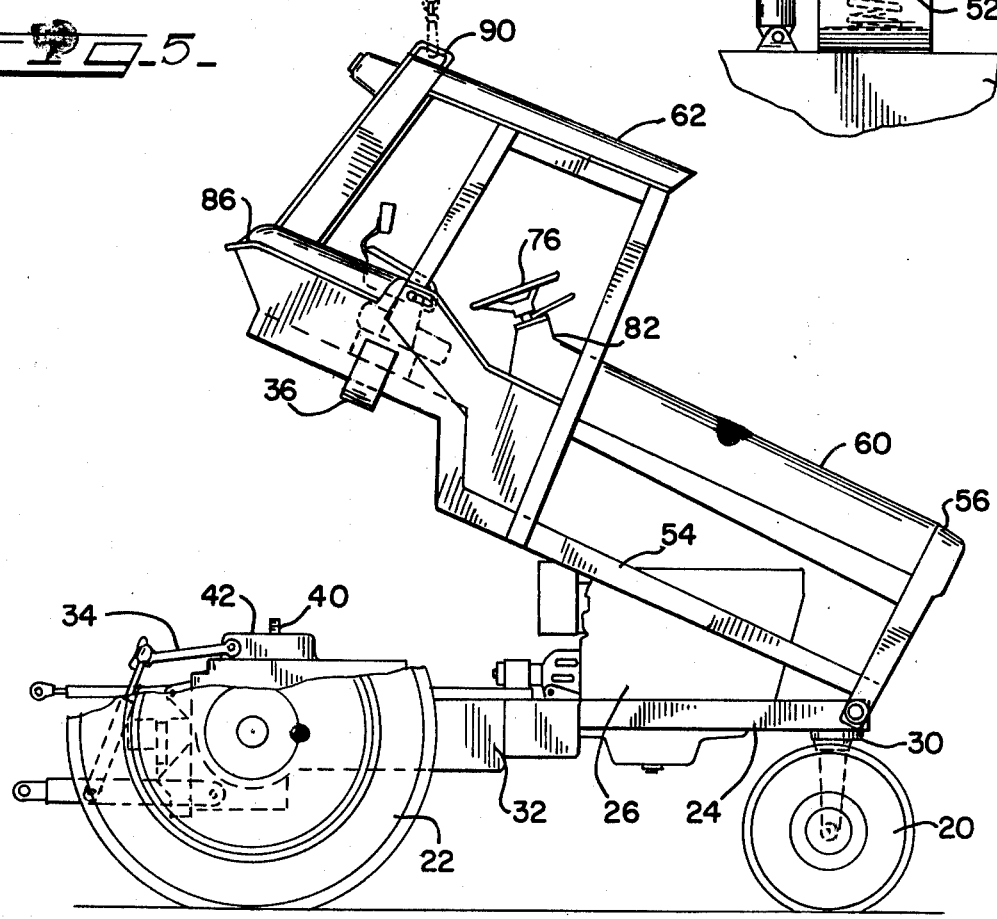

TRACTOR CHASSIS AND CAB SUSPENSION SYSTEM

BACKGROUND OF THE INVENTION

1. Field of the Invention

This invention concerns tractor vehicle cab suspension embodiments.

More specifically, a tractor cab suspension system where an operator's cab or alternatively an operator's work station platform in tractors without cabs, is integrally attached to the front portion sheet metal of the tractor and the entire superstructure assembly is pivotally mounted to the forward portion of the tractor running gear frame. The rear portion of the integrated cab and front sheet material is suspended on a coil spring. A pair of vertical members coact with vertical walls of the cab subfloor extension to limit lateral movement of the integrated assembly while allowing vertical movement of the rear section on an arc generated around the front pivot point. Wheels, axially carried on the inner sides of the frame mounted vertical members, may be provided to insure unhampered movement in a vertical plane between the integrated superstructure and the tractor running gear frame.

2. Description of the Prior Art

It is known in the highway truck art to provide suspended cabs for improved ride. These cabs may be pivotally mounted at the front thereof to the vehicle frame and may also be provided with coil spring suspension system at the back section of the cab.

In the tractor art, which has more stringent and diverse cab suspension problems (vis-a-vis highway trucks) due to the general roughness of the supporting terrain, it appears that emerging technology to provide more comfortable operator environments is being centered around the suspension of the cab or operator's work area only. Generally a three or four point cab mounting system is provided. Coil spring and shock absorber systems are seen as one alternative to a diverse spectra of designs. One difficulty with these designs may often be the lateral deflection of the cab in a roll over due to the magnitude of suspension travel allowed in these designs. This problem is not presented in the instant invention as the lateral movement of the cab is restricted by the vertical uprights of a generally U-shaped member and horizontal cab deflection is restricted through the relatively close tolerance of the suspended superstructure at the forward pivot point on the front of the vehicle at the frame.

Another problem with prior art tractor vehicles having the superstructure spring mounted above the vehicle frame and running gear is that it is difficult to maintain a sealed relationship between the inside of the floating hood and the top (and sides) of the radiator as these parts separate. Current designs require an expandable dam, most generally an elastomer bellows, to maintain this sealed arrangement. This problem does not exist with the design herein described as the inner surface of the hood sheet moves only a small distance on an arcuate path around the front pivot point. The conventional dam of current production tractors flexes sufficiently to accommodate this insignificant displacement between the inside of the hood and the top and sides of the heat exchanger.

Furthermore tractor vehicles are known that have integrated cab and front sheet metal sections suspended over the vehicle frame. The only examples of these embodiments known to the inventor are tractor superstructure suspension systems where at least four suspension points are provided. Two of these suspension points are at the forward end of the vehicle and two are at the rear. No tractor vehicles of which we are aware appear to have the combination forward pivot point and rear suspension with the U-shaped guide frame of this invention.

SUMMARY OF THE INVENTION

A tractor comprising a running gear frame section including power train components, front and rear axles (with wheels and tires), an engine and various frame rail sections is provided. This frame is also termed a subframe in this specification. A superstructure including a superstructure frame, the front sheet metal of the tractor, an operator's work platform and a cab which may be built on the work platform to be a part thereof is carried on this subframe section. The superstructure is pivotally mounted to the front of the subframe and is suspended on a spring system at the rear of the subframe. Through this arrangement the superstructure is capable of vertical movement in a longitudinal plane about the front pivot point.

In order to control sideways or lateral deflection of the superstructure a U-shaped member is fixedly mounted to the subframe such that it can accommodate, in the interior section thereof, a complementary cab subfloor extension having vertical surfaces inboard of the vertical members of the U-shaped member. To enhance free movement between the cab subfloor extension and the U-shaped member a plurality of pre-loaded rollers are mounted on the vertical legs of the U-shaped member and are generally in contact with the vertical components of the cab subfloor extension.

Downward travel of the cab resulting in compression of the suspension may be limited by elastic snubbers at the bottom of the cab subfloor extension while upward travel or extension may be limited by protuberances on the cab subfloor extension which interact with the rollers affixed to the vertical uprights of the U-shaped member. Dampening of the suspension travel is accomplished through the use of a shock absorber which may be adjustable either from within or from outside the cab to suit the operator.

It is amongst the objects of this invention to provide a tractor vehicle with a cab suspension that will reduce operator fatigue by improving the tractor ride through the use of a cab suspension system where the rear fenders, hood, engine sheet metal and grille all float in unison above the tractor frame.

Furthermore it is an object to provide a suspended cab that is restricted in lateral movement and side blows as a result of tractor roll over relative to the tractor frame but is relatively unrestricted in vertical movement over a limited range of travel.

Another object of the invention is that the entire superstructure could be pivoted around the forward pivot point to provide access for servicing the subframe carried components.

Another advantage of this invention is that good operator ride could be accomplished without the need to resort to a suspension seat.

A significant advantage of this invention is that all the operator's controls would float with the cab and the operator and would not bounce individually as on contemporary tractors.

Also an advantage is that the vibration from the frame and partially from the clutch housing or rear of the engine is not transmitted directly into the cab section thus effectively reducing the noise level in the cab.

BRIEF DESCRIPTION OF THE DRAWINGS

The above objects and advantages of this invention, as well as others not set forth above, will be apparent through reference to the following drawing figures and the attached explanation presented herein wherein the figures are:

FIG. 1 is a side elevation view of a tractor vehicle incorporating this invention with portions broken away to emphasize the invention;

FIG. 2 is a representation of a rear of a tractor vehicle with portions removed and/or sectioned to show the invention;

FIG. 3 is a side elevation view of the suspension arrangement;

FIG. 4 is a representation of the front pivoting arrangement; and

FIG. 5 is a view of a tractor vehicle where the superstructure has been pivoted upwardly for rear axle access.

DETAILED DESCRIPTION OF THE INVENTION

A preferred embodiment answering the objects and advantages as set forth above is presented in the drawing figures in which FIG. 1 presents generally a tractor vehicle 10 which may be considered to have a running gear supporting subframe generally 12 and a superstructure generally 14 which is pivotally mounted to the subframe 12 at pivot point 16.

As shown in the various views the running gear frame or subframe generally 12 is supported by front 20 and rear 22 wheel assemblies (right side only shown), which include typical pneumatic tires and wheels mounted on axles in a conventional manner. An engine supporting frame 24 accommodates a conventional engine 26 as well as a conventional front axle bolster 30. The frame 24 is contiguous and associated with drive train components 32 which typically would include a transmission, rear axle housing, differential housing, brake housing, and hitch control elements 34 as is well known in the art.

A U-shaped member 36, not found in prior art tractor vehicles, is fastened as by fasteners typified by nut and bolt assembly 40 to an upper component casting of the drive train such as rock shaft housing 42 which may be considered part of the subframe. The U-shaped member also includes a plurality of contact rollers such as 44 mounted to the inside surfaces of the uprights of the "U" as shown in FIG. 2. These rollers may be either metallic, elastomer or other composition rollers as may be desirable. The use of elastomer rollers would serve to allow preloading between the rollers and the inverted U-shaped member to provide a degree of ocellation dampening. Also attached to the bottom inside surfaces of the U-shaped member is the lower mounting bracket 46 accommodating and grounding one end of a shock absorber 50 (FIGS. 2 and 3). Provisions may also be provided to allow retention of a coil spring 52 to the top side of the center section of the U-shaped member.

The superstructure 14 is generally supported on a frame 54 with the forward portion thereof pivoted around pivot point 16. Among the components of the superstructure are the grille 56, the engine hood 60, a cab 62 including a plurality of roof supports 64, 66, and 70, a roof 72, an operator's platform 74 or compartment containing vehicle control equipment such as the steering wheel 76, throttle control 80, instrument panel 82, as well as a seat 84. Fenders such as 86 are provided to partially cover the rear tires.

Superstructure lift handles 90 are provided on the upper portion of the cab 62 to allow the attachment of a hoist that, as will be explained further on, raises the rear of the superstructure and pivots the entire superstructure 14 around pivot point 16.

In FIG. 2 a simplified rear view of the tractor vehicle is provided to show the suspension means suspending the superstructure 14 above the subframe 12. The cab and hitch are among the items left off this view for the sake of clarity. Provided in the figure is the vehicle seat 84 which is supported on pedestal 92 above the floor 94. A relatively narrow structure is provided at the rear part of the operator's platform. This section generally 96 of the cab provides alignment guidance that dictates the vertical travel of the superstructure 14 relative to the running gear frame 12. Vertical walls 100 and 102 provide surfaces on which the rollers 44 engage the superstructure. This superstructure is the subfloor extension referred to above. A subfloor 104 separates these two walls and is further provided with a well 106 or cavity to accommodate the coil spring 59 and, in one embodiment, the shock absorber 50 which can be carried in the coil spring. Shock absorber mounting flange 110 is provided to secure the second end of the shock absorber to the subfloor cavity 106.

It is obvious that the suspension arrangement under the cab allows some arcuate movement of the entire superstructure around pivot point 16. The upward motion of the superstructure is constrained by tabs 112 and 114 integral with the superstructure. These tabs limit upward travel when they contract the lower roller as shown by broken line representation B representing the uppermost limit of travel. Of course the superstructure can move downward from the solid line position A to compress the spring and shock absorber therefore bumpers or snubbers of elastic material 116 and 120 are provided to snub this action.

Several details of interest are provided in FIGS. 3 and 4. FIG. 3 shownes a side elevation view of the suspension system in FIG. 2. The subfloor 104 and the subfloor cavity 106 can be seen in the typical relationship with the spring 52, the shock absorber 50 and its mounting arrangement 46 and 110. Rollers 44 contact and roll on the vertical wall surface 102 of the subfloor extension. The vertical travel stop tabs and snubbers have not been shown in this view for reasons of clarity. In FIG. 4 it can be seen how pivot point 16, here represented by axles 120 and 122 are affixed to the bolster 30 which houses the front wheel support 124. The inclusion of a vibration dampening means such as the rubber bushing 128 shown in a broken away view on axle 120 would be desirous to minimize the conduction of noise and vibration into the superstructure. The bushing 138 on axle 122 is illustrative of an alternative non-elastic bushing. One superstructure frame member 54 is identified. Transverse support bar 126 maintains distance between the frame members. Engine enclosure sheet metal 128 would also typically be carried by the superstructure frame members 54. The grille has been left out of this view for the sake of clarity.

FIG. 6 presents a slightly different shock absorber 130 location. In this embodiment the shock is not mounted inside the spring. In operation the suspension system is identical to that shown in the other figures.

The primary function of building the tractor vehicle as illustrated is to reduce operator fatigue through a more advantageous suspension system. As this tractor is driven the entire superstructure is constantly pivoting around the front pivot point. This would mean that the vehicle operator as well as the steering wheel and all the apparatus of the operator's work station including the vehicle gauges will be undulating in unison while the undercarriage or subframe as well as the hitch and of course its attendant implement will maintain full contact with the ground.

In addition to this advantage the further advantage of this embodiment is shown in FIG. 5 wherein the entire superstructure has been pivoted around the pivot point such that access to various components of the drive train is possible. In order to accomplish this it should be noted that the U-shaped member 36 has been unbolted from the fastener 40 such that the spring is still maintained between the U-shaped member and the superstructure. With the shock absorber mounted as shown in FIG. 6, i.e. not inside the spring between the U-shaped member and the subfloor cavity 106, it would be necessary to detach the shock absorber from either the superstructure or the subframe member 42. In the FIG. 5 embodiment it would be appropriate to lift the superstructure by means provided by the handle on the top of the cab identified as item 90.

It should be apparent that there has been provided a suspension cab for use on a tractor chassis that satisfies the objects and advantages as set forth above. While this invention has been described in conjunction with two embodiments thereof it is evident that alternatives and modifications would be apparent to those working in this art in light of this specification. Accordingly this specification is intended to embrace all such alternatives, modifications and variations as found in the spirit and broad scope of the following claims.

What is claimed is:

1. A tractor vehicle comprising:
    a subframe having a forward portion and a rear portion and having a plurality of wheels;
    a superstructure including a frame, an operator's work station and an engine hood integrally carried on said superstructure frame which is pivotally mounted to the forward portion of said subframe;
    a U-shaped member affixed to said subframe under the operator's work station;
    a plurality of rollers supported on the upwardly extending legs on the interior of said U-shaped member;
    a pair of spaced apart vertical surfaces projecting downwardly from the operator's work station into said U-shaped member where said plurality of rollers contact said vertical surfaces;
    a suspension means mounted between the bottom of said operator's work station and the rear portion of said subframe.

2. The invention in accordance with claim 1 wherein said U-shaped member is a substantial metallic structure where the base of the "U" is longer than the height of the legs of the "U" and the base is further provided with a plurality of apertures.

3. The invention in accordance with claim 1 wherein said suspension means comprises:
    a coil spring positioned between the tractor subframe and the suspended superstructure at the rear portion of the vehicle; and
    a shock absorber positioned between the tractor subframe and the suspended superstructure at the rear portion of the vehicle.

4. The invention in accordance with claim 1 wherein said suspension means comprises:
    a coil spring positioned between the tractor subframe and the suspended superstructure at the rear portion of the vehicle; and
    a shock absorber carried in the central vertical void of the coil spring and positioned between the tractor subframe and the suspended superstructure.

5. The invention in accordance with claim 1 wherein the operator's work station comprises:
    a floor;
    an operator accommodating seat supported on said floor;
    a rollover protective structure supported on said floor including a roof portion; and
    vehicle control apparatus including a steering wheel, an instrument panel, and throttle controls integral with said superstructure arranged to be within the operator's normal reach.

6. The invention in accordance with claim 1 wherein said superstructure further includes a grille shell and a grille at the forward portion of the superstructure.

7. The invention in accordance with claim 1 wherein the superstructure further incorporates a superstructure lifting handle located towards the rear of the superstructure.

8. A tractor vehicle comprising:
    a subframe supported on a plurality of wheels including a pair of drive wheels at the rear of the subframe and a pair of steerable wheels at the front portion of the subframe;
    a superstructure including an operator's work station including a floor, a rollover protective structure supported on said floor and vehicle control apparatus, said superstructure also including an engine covering hood and a grille;
    a U-shaped member affixed to the subframe under the operator's work station, said U-shaped member having a wide base and a pair of upwardly extending legs which carry a plurality of rollers on the inside surfaces of each of the upwardly extending legs;
    a substantially boxlike structure extending downwardly from the operator's work station into the open area between the upwardly extending legs of the U-shaped member, the boxlike structure having a pair of spaced apart vertical surfaces which are contacted by said rollers on the inside of said legs;
    a suspension means mounted between the bottom of said operator's work station and the rear portion of said subframe.

9. The invention in accordance with claim 8 wherein said suspension means comprises:
    a coil spring positioned between the tractor subframe and the suspended superstructure at the rear portion of the vehicle; and
    a shock absorber positioned between the tractor subframe and the suspended superstructure at the rear portion of the vehicle.

10. The invention in accordance with claim 8 wherein said suspension means comprises:

a coil spring positioned between the tractor subframe and the suspended superstructure at the rear portion of the vehicle; and a shock absorber carried in the central vertical void of coil spring and positioned between the tractor subframe and the suspended superstructure.

11. The invention in accordance with claim 8 wherein the superstructure further incorporates a superstructure lifting handle located towards the rear of the superstructure.

* * * * *